US012638801B2

(12) United States Patent
Keese

(10) Patent No.: US 12,638,801 B2
(45) Date of Patent: May 26, 2026

(54) TONER RAKE ASSEMBLY WITH STATIC TINES FOR IMPROVED TONER RAKING

(71) Applicant: LEXMARK INTERNATIONAL, INC., Lexington, KY (US)

(72) Inventor: Darren Adam Keese, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 19/007,738

(22) Filed: Jan. 2, 2025

(65) Prior Publication Data

US 2025/0216811 A1 Jul. 3, 2025

Related U.S. Application Data

(60) Provisional application No. 63/709,787, filed on Oct. 21, 2024, provisional application No. 63/617,128, filed on Jan. 3, 2024.

(51) Int. Cl.

| | |
|---|---|
| ***G03G 21/10*** | (2006.01) |
| ***G03G 15/08*** | (2006.01) |
| ***G03G 21/12*** | (2006.01) |

(52) U.S. Cl.

CPC ....... *G03G 21/105* (2013.01); *G03G 15/0844* (2013.01); *G03G 15/0889* (2013.01); *G03G 15/0891* (2013.01); *G03G 15/0896* (2013.01); *G03G 21/10* (2013.01); *G03G 21/12* (2013.01)

(58) Field of Classification Search

CPC ........... G03G 15/0844; G03G 15/0889; G03G 15/0891; G03G 15/0896; G03G 21/10; G03G 21/105; G03G 21/12

See application file for complete search history.

(56) References Cited

U.S. PATENT DOCUMENTS

| | | | | |
|---|---|---|---|---|
| 7,280,776 B2 | 10/2007 | Cook et al. | | |
| 8,233,834 B2 | 7/2012 | Horrall et al. | | |
| 9,904,212 B2 | 2/2018 | Meneses | | |
| 2007/0264036 A1* | 11/2007 | Craig | G03G 21/105 | 399/358 |
| 2010/0054832 A1* | 3/2010 | Horrall | G03G 21/12 | 399/358 |
| 2017/0075257 A1* | 3/2017 | Meneses | G03G 21/12 | |

* cited by examiner

*Primary Examiner* — Joseph S Wong

(57) ABSTRACT

A toner rake assembly for an image forming device according to one example embodiment includes a spine movable in a reciprocating manner along a length of the spine, a plurality of first projections from the spine that are movable with the spine, and a plurality of second projections from a fixed surface adjacent to the spine. The plurality of first projections are movable relative to the plurality of second projections when the spine moves in the reciprocating manner. The plurality of second projections are positioned above the plurality of first projections such that heaps of toner that form above the plurality of first projections are pushed against one or more of the plurality of second projections when the spine moves in the reciprocating manner.

20 Claims, 12 Drawing Sheets

TONER RAKE ASSEMBLY WITH STATIC TINES FOR IMPROVED TONER RAKING

CROSS REFERENCES TO RELATED APPLICATIONS

This application claims priority to U.S. Provisional Patent Application Ser. No. 63/617,128, filed Jan. 3, 2024, entitled "Static Tines for Improved Rate of Toner Raking" and to U.S. Provisional Patent Application Ser. No. 63/709,787, filed Oct. 21, 2024, entitled "Toner Rake Assembly with Static Tines for Improved Toner Raking" the contents of which are hereby incorporated by reference in their entirety.

BACKGROUND

1. Field of the Disclosure

The present disclosure relates generally to image forming devices and more particularly to a toner rake assembly with static tines for improved toner raking.

2. Description of the Related Art

Image forming devices such as printers, copiers, facsimile machines, and the like, produce unusable "waste" or residual toner as a byproduct of an electrophotographic (EP) process. Ideally, all toner that is picked up by a photoconductive (PC) drum, such as from a developer roll in a single component development system or from a magnetic roll in a dual component development system, would be transferred onto a media sheet in a one-step toner transfer process or, prior to the media sheet, onto an intermediate transfer member (ITM) in a two-step toner transfer process. However, due to inefficiencies, some of the toner picked up by the PC drum does not get transferred to the media sheet or ITM. This residual toner left on the PC drum after it has contacted the media sheet or ITM must be removed before the next image is formed otherwise print defects may occur. A cleaner blade or a cleaner brush is typically placed in contact with the PC drum to wipe and remove residual toner from its surface. A similar cleaning operation may be performed to remove residual toner from the ITM where a two-step toner transfer process is used.

Waste toner is typically delivered to and stored in a removable waste toner container to prevent the waste toner from releasing inside the image forming device. Waste toner may enter the waste toner container from one or more inlet ports and the waste toner may form heaps at the locations of the ports. In color EP image forming devices, for example, multiple inlet ports may be required for each of the different color toners. Different customers will print different content. For example, some customers print all black text, others print multi-colored photos, and others may print just one color. As a result, the amount of toner entering each inlet port of the waste toner container may be unpredictable, making it difficult to evenly distribute toner in the waste toner container. In addition, since waste toner enters the inlet ports at varying rates, multiple sensors may be required to detect all potential heap locations. If one of the sensors declares a full container when one of these heaps reaches the maximum allowable height, a significant portion of the volume of the waste toner container can be left empty and wasted. Accordingly, a mechanism that provides improved distribution of waste toner to maximize the amount of toner that can be stored in a waste toner container is desired.

SUMMARY

A toner rake assembly for an image forming device according to one example embodiment includes a spine movable in a reciprocating manner along a length of the spine, a plurality of first projections from the spine that are movable with the spine, and a plurality of second projections from a fixed surface adjacent to the spine. The plurality of first projections are movable relative to the plurality of second projections when the spine moves in the reciprocating manner. The plurality of second projections are positioned above the plurality of first projections such that heaps of toner that form above the plurality of first projections are pushed against one or more of the plurality of second projections when the spine moves in the reciprocating manner.

Embodiments include those wherein the plurality of first projections protrude in a first direction and the plurality of second projections protrude in a second direction opposite the first direction. In some embodiments, the plurality of first projections and the plurality of second projections are parallel relative to each other. In some embodiments, the plurality of second projections are perpendicular relative to the spine. Embodiments include those wherein the plurality of second projections extend in close proximity to the spine. In some embodiments, the plurality of first projections overlap with the plurality of second projections such that an imaginary vertical plane extending along the length of the spine intersects the plurality of first projections and the plurality of second projections. In some embodiments, at least some of the plurality of second projections are arranged unevenly spaced from each other for directing toner in a predetermined direction along the length of the spine. Embodiments include those wherein the toner rake assembly includes a plurality of third projections from the spine that are movable with the spine. In one embodiment, the plurality of third projections are positioned above the plurality of second projections.

A toner rake assembly for an image forming device according to another example embodiment includes a spine movable in a reciprocating manner along a length of the spine, a plurality of rake tines extending from the spine and movable with the spine, and a plurality of static tines extending toward the spine. The plurality of rake tines are movable relative to the plurality of static tines when the spine moves in the reciprocating manner. The plurality of static tines are positioned above the plurality of rake tines and an imaginary vertical plane extending along the length of the spine intersects the plurality of static tines and the plurality of rake tines.

A waste toner container for an image forming device according to one example embodiment includes a housing having a reservoir for storing toner and an inlet for receiving toner. A spine is positioned within the reservoir and is movable in a reciprocating manner along a length of the spine. A plurality of rake tines extend from the spine and are movable with the spine. A plurality of static tines extend from a fixed surface toward the spine. The plurality of rake tines extend toward the fixed surface and are movable relative to the fixed surface and the plurality of static tines when the spine moves in the reciprocating manner. The plurality of static tines are positioned lower than the inlet and above the plurality of rake tines for breaking down toner heaps between the plurality of rake tines and the inlet when the spine moves in the reciprocating manner.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense, and the scope of the present disclosure is defined only by the appended claims and their equivalents.

Figure 1:
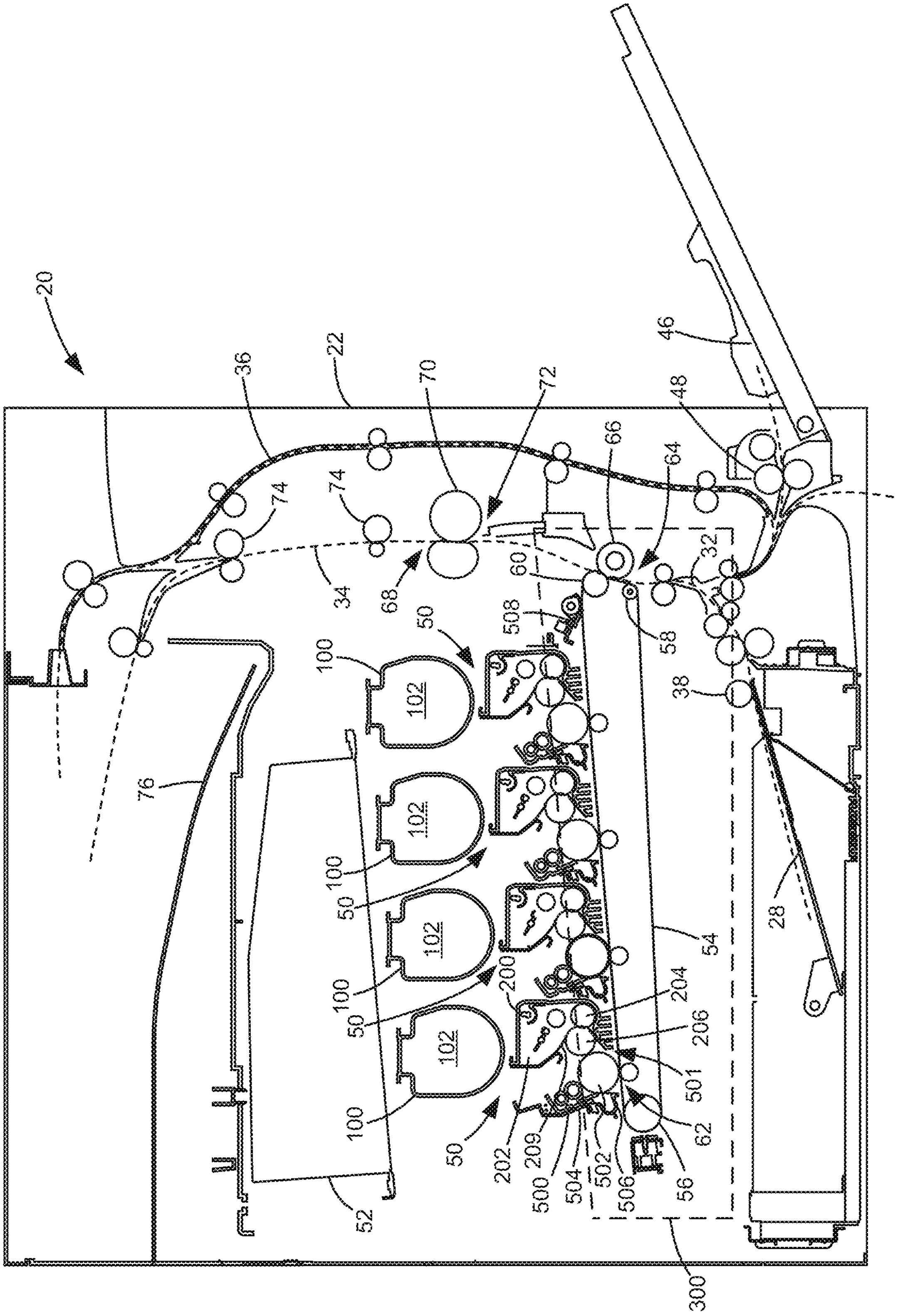
FIG. 1 is a schematic view of an image forming device according to one example embodiment.

FIG. 1 illustrates a schematic view of the interior of an example image forming device 20. Image forming device 20 includes a housing 22. Housing 22 includes one or more input trays 28 positioned therein. Each tray 28 is sized to contain a stack of media sheets. As used herein, the term media is meant to encompass not only paper but also labels, envelopes, fabrics, photographic paper and any other desired substrate. Trays 28 are preferably removable for refilling. A control panel may be located on housing 22. Using the control panel, a user is able to enter commands and generally control the operation of image forming device 20. For example, a user may enter commands to switch modes (e.g., color mode, monochrome mode), view the number of images printed, etc. A media path 32 extends through image forming device 20 for moving the media sheets through the image transfer process. Media path 32 includes a simplex path 34 and may include a duplex path 36. A media sheet is introduced into simplex path 34 from tray 28 by a pick mechanism 38. In the example embodiment shown, pick mechanism 38 includes a roll positioned to move the media sheet from tray 28 and into media path 32. The media sheet is then moved along media path 32 by various transport rollers. Media sheets may also be introduced into media path 32 by a manual feed 46 having one or more rolls 48 or by additional media trays.

Image forming device 20 includes an image transfer section that includes one or more imaging stations 50. Each imaging station 50 includes a toner cartridge 100, a developer unit 200 and a photoconductor unit (PC unit) 500. Each toner cartridge 100 includes a reservoir 102 for holding toner and an outlet port in communication with an inlet port of a corresponding developer unit 200 for transferring toner from reservoir 102 to developer unit 200. In the example embodiment illustrated, developer unit 200 utilizes what is commonly referred to as a single component development system. In this embodiment, each developer unit 200 includes a toner reservoir 202 and a toner adder roll 204 that moves toner from reservoir 202 to a developer roll 206. Each PC unit 500 includes a charging roll 504, a photoconductive (PC) drum 502, and a cleaner unit 506 for each imaging station 50. PC drums 502 are mounted substantially parallel to each other. For purposes of clarity, developer unit 200 and PC unit 500 are labeled on only one of the imaging stations 50 in FIG. 1. In the example embodiment illustrated, each imaging station 50 is substantially the same except for the color or type of toner contained therein.

Bach charging roll 504 forms a nip with the corresponding PC drum 502. During a print operation, charging roll 504 charges the outer surface of PC drum 502 to a specified voltage. A laser beam from a printhead 52 associated with each imaging station 50 is then directed to the outer surface of PC drum 502 and selectively discharges those areas it contacts to form a latent image. Developer roll 206 then transfers toner to PC drum 502 to form a toner image on the surface of PC drum 502. A metering device, such as a doctor blade 209, may be used to meter toner on the outer surface of developer roll 206 and apply a desired charge to the toner prior to its transfer to PC drum 502. Toner on developer roll 206, which forms a nip 501 with PC drum 502, is attracted to the areas of the outer surface of PC drum 502 discharged by the laser beam from printhead 52.

In the example embodiment illustrated, an intermediate transfer mechanism (ITM) 54 is disposed adjacent to imaging stations 50. In this embodiment, ITM 54 is formed as an endless belt trained about a drive roll 56, a tension roll 58 and a back-up roll 60. During print operations, ITM 54 moves past imaging stations 50 in a counterclockwise direction as viewed in FIG. 1. One or more of PC drums 502 apply toner images in their respective colors to ITM 54 at a first transfer nip 62. ITM 54 rotates and collects the one or more toner images from imaging stations 50 and then conveys the toner images to a media sheet advancing through simplex path 34 at a second transfer nip 64 formed between a transfer roll 66 and ITM 54, which is supported by back-up roll 60. In other embodiments, the toner image is transferred to the media sheet directly by the PC drum(s) 502. Cleaner unit 506 removes toner remnants from PC drum 502 and a waste toner removal unit 508 removes toner remnants from ITM 54. The toner remnants are delivered to and stored in a waste toner container 300 to prevent the residual toner from releasing inside image forming device 20.

The media sheet with the toner image is then moved along the media path 32 and into a fuser area 68. Fuser area 68 includes fusing rolls or belts 70 that form a nip 72 to adhere the toner image to the media sheet. The fused media sheet then passes through transport rolls 74 located downstream from fuser area 68, which move the media sheet to an output area 76 of image forming device 20 or to duplex path 36 for image formation on a second side of the media sheet, as desired.

A monocolor image forming device 20 may include a single imaging station 50, as compared to a color image forming device 20 that may include multiple imaging stations 50.

Figure 2:
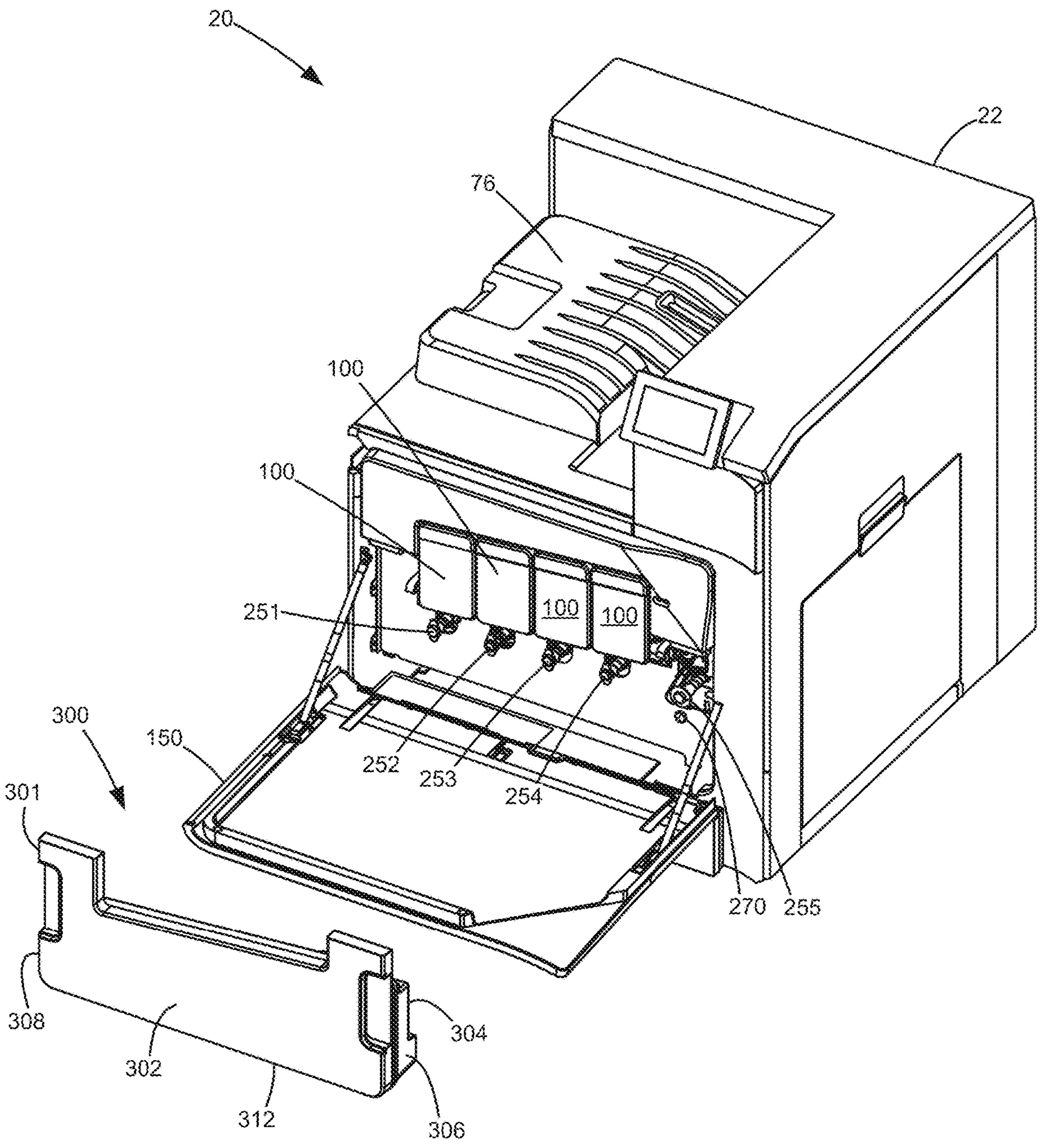
FIG. 2 is a perspective view of the image forming device shown in FIG. 2 with a front access door opened and a waste toner container detached from the image forming device according to one example embodiment.

FIG. 2 illustrates an example of image forming device 20 having housing 22 with an access door 150 in a lowered, open position exposing interior components of image forming device 20, such as toner cartridges 100, and waste toner container 300 according to one example embodiment. In the embodiment illustrated, waste toner container 300 is removably installable in image forming device 20 and is shown removed from image forming device 20.

In the embodiment illustrated, waste toner collected by cleaner unit 506 in image forming device 20 for each of the different color toners are sent to waste toner container 300 through respective waste toner outlets 251, 252, 253, 254 and waste toner collected by waste toner removal unit 508 from ITM 54 are sent to waste toner container 300 through waste toner outlet 255. Each waste toner outlet 251, 252, 253, 254, 255 extends toward waste toner container 300.

Figure 3:
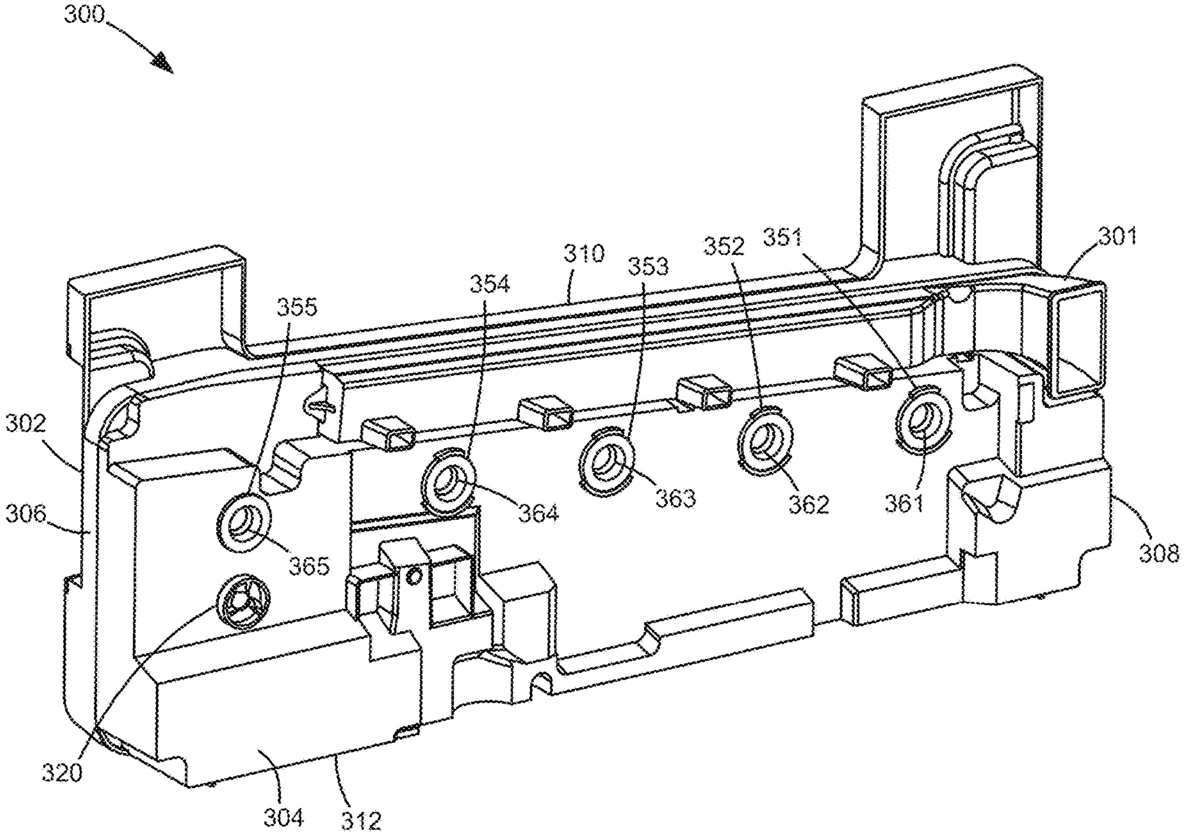
FIG. 3 is a rear perspective view of the waste toner container shown in FIG. 2.

FIG. 3 is a rear perspective view of waste toner container 300. Waste toner container 300 includes a housing 301 having a front wall 302, a rear wall 304, opposed side walls 306, 308, a top 310, and a bottom 312 forming an enclosed waste toner reservoir for holding a quantity of waste toner. In the embodiment illustrated, waste toner container 300 includes a plurality of waste toner inlet ports 351, 352, 353, 354 for receiving waste toner from corresponding waste toner outlets 251, 252, 253, 254 and waste toner inlet port 355 for receiving waste toner from waste toner outlet 255. Waste toner outlets 251, 252, 253, 254, 255 are received by respective waste toner inlet ports 351, 352, 353, 354, 355 of waste toner container 300 when waste toner container 300 is installed in image forming device 20 to allow waste toner to be deposited into waste toner container 300. Waste toner inlet ports 351, 352, 353, 354, 355 define respective through holes or openings 361, 362, 363, 364, 365 on rear wall 304 of housing 301 through which respective waste toner outlets 251, 252, 253, 254, 255 of image forming device 20 are inserted into the waste toner reservoir for depositing waste toner therein.

In the embodiment illustrated, a drive coupler 320 is exposed on an outer portion of housing 301 in position to receive rotational force from a corresponding drive system in image forming device 20 when waste toner container 300 is installed in image forming device 20 to drive movable components of waste toner container 300. The drive system in image forming device 20 may include one or more drive motors and a drive transmission from the drive motor(s) to a drive coupler 270 (See FIG. 2) that mates with drive coupler 320 of waste toner container 300 when waste toner container 300 is installed in image forming device 20. In the example embodiment illustrated, drive coupler 320 is positioned on rear wall 304 of housing 301. Drive coupler 320 is operatively connected to one or more components in waste toner container 300 for handling toner within waste toner container 300 as discussed below.

Figure 4:
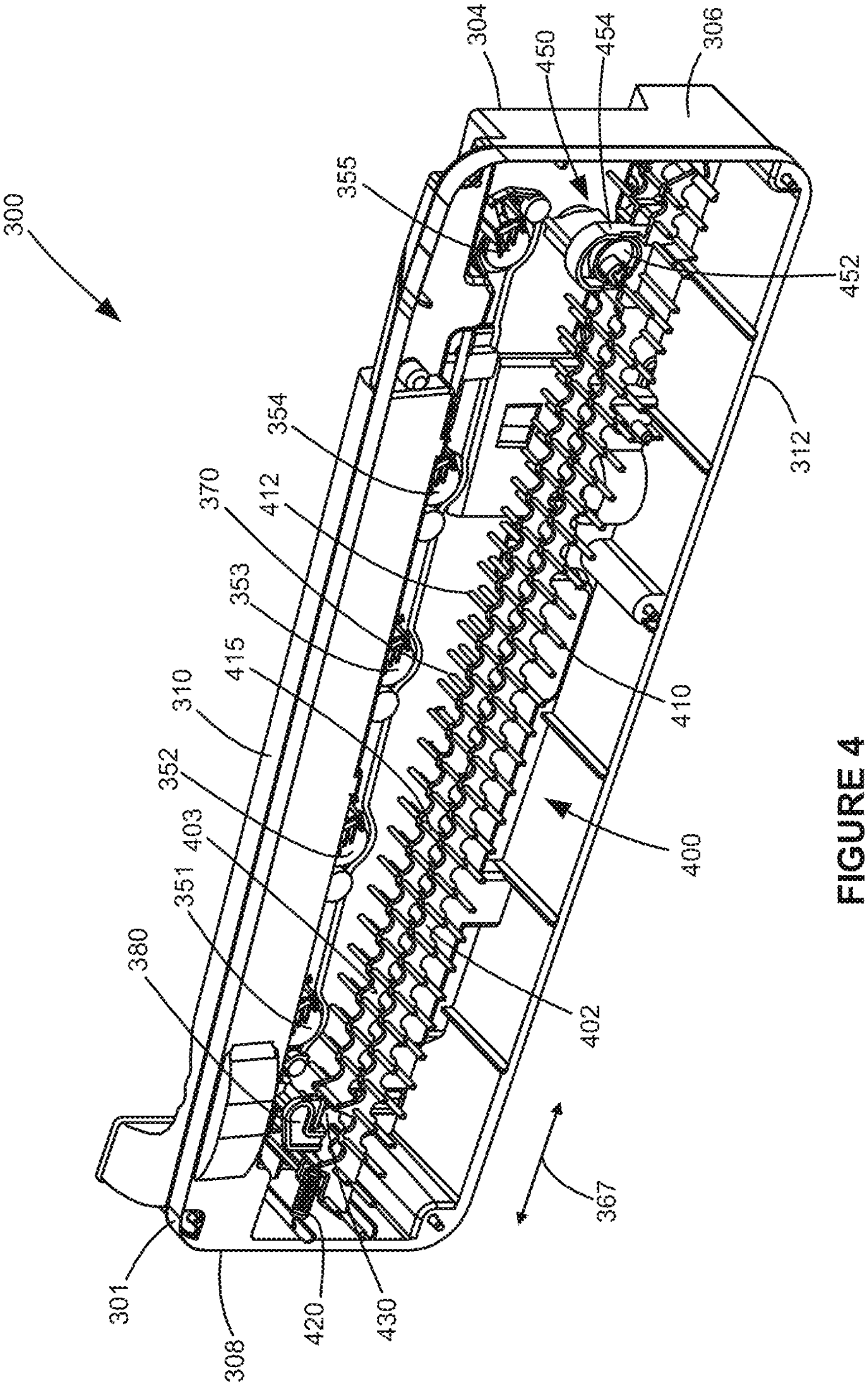
FIG. 4 is a perspective view of the waste toner container shown in FIGS. 2 and 3 with a front wall removed to show interior components of the waste toner container including a toner rake assembly according to one example embodiment.
Figure 5:
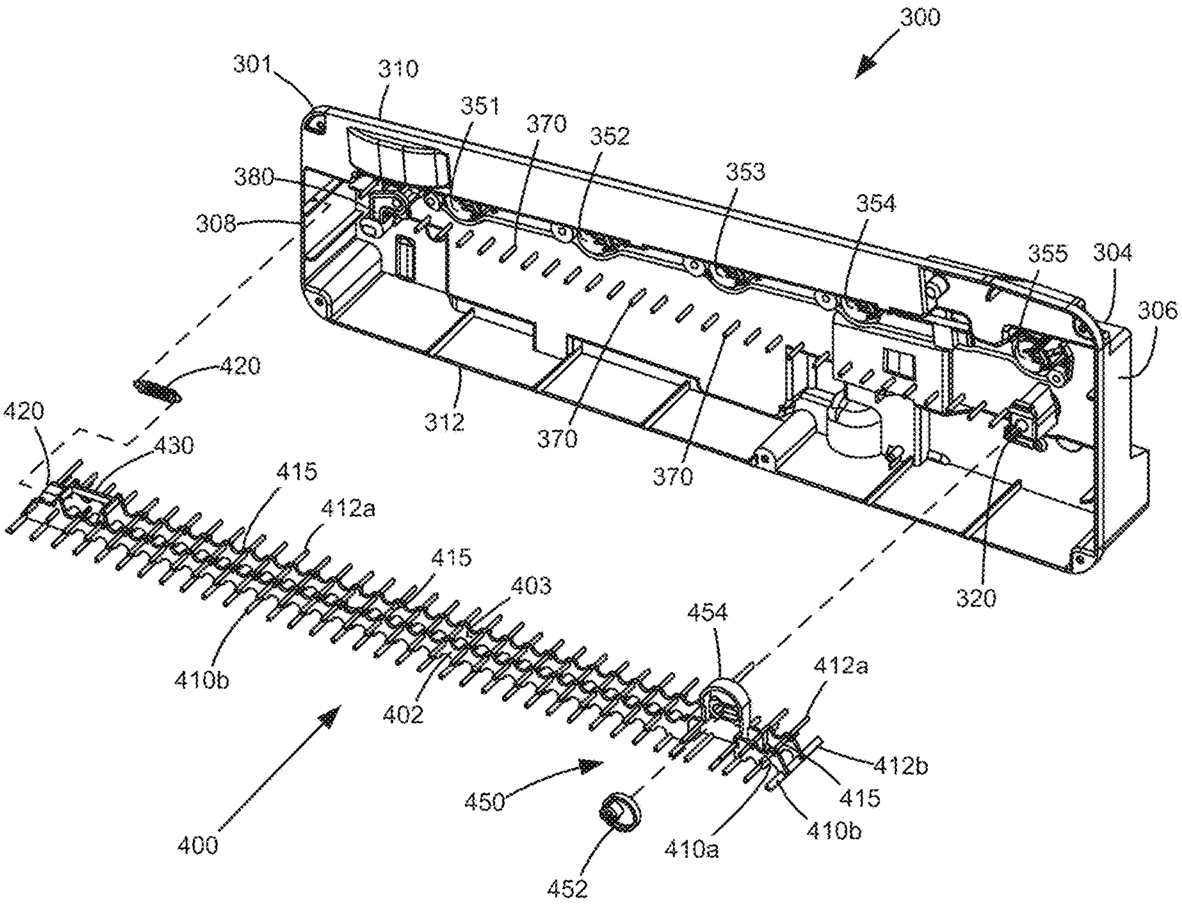
FIG. 5 is an exploded view of the waste toner container shown in FIG. 4 according to one example embodiment.
Figure 6:
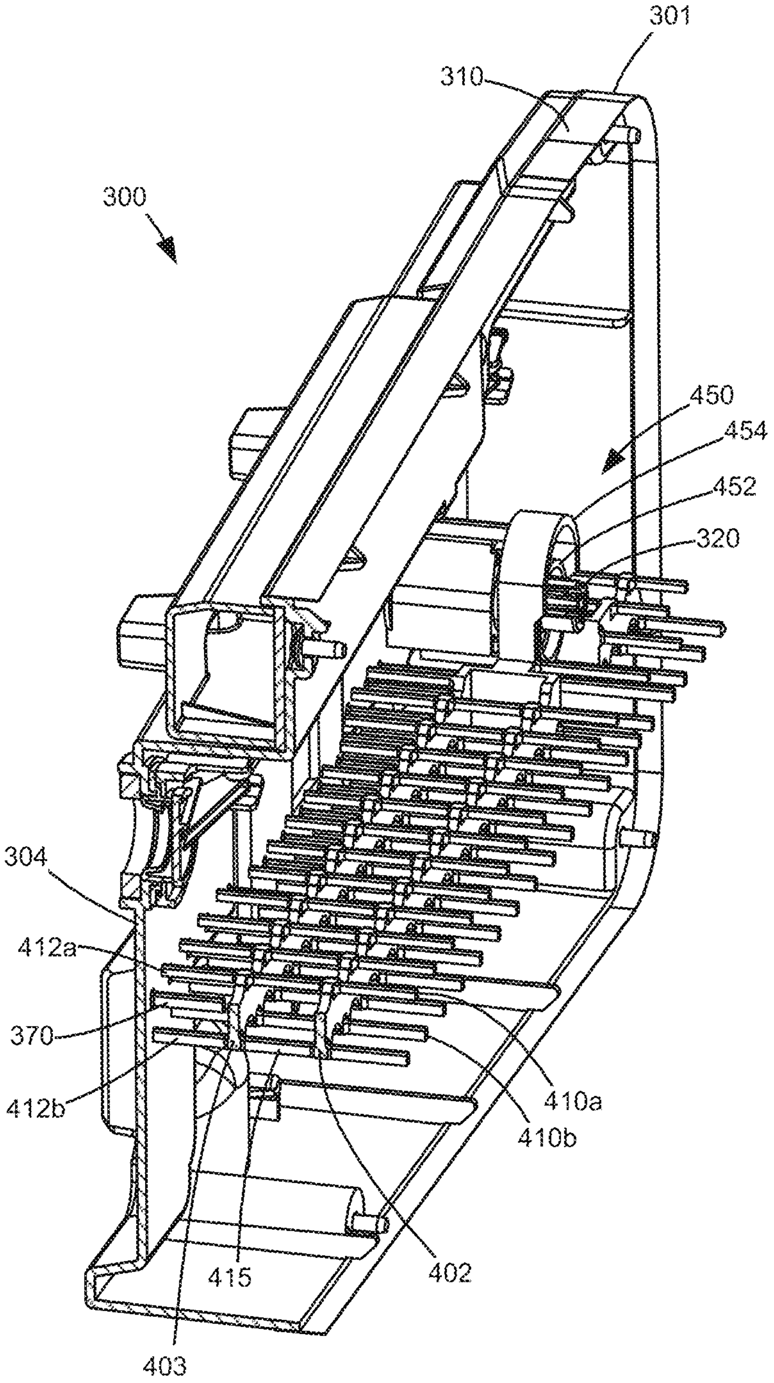
FIG. 6 is a side perspective section view of the waste toner container according to one example embodiment.
Figure 7:
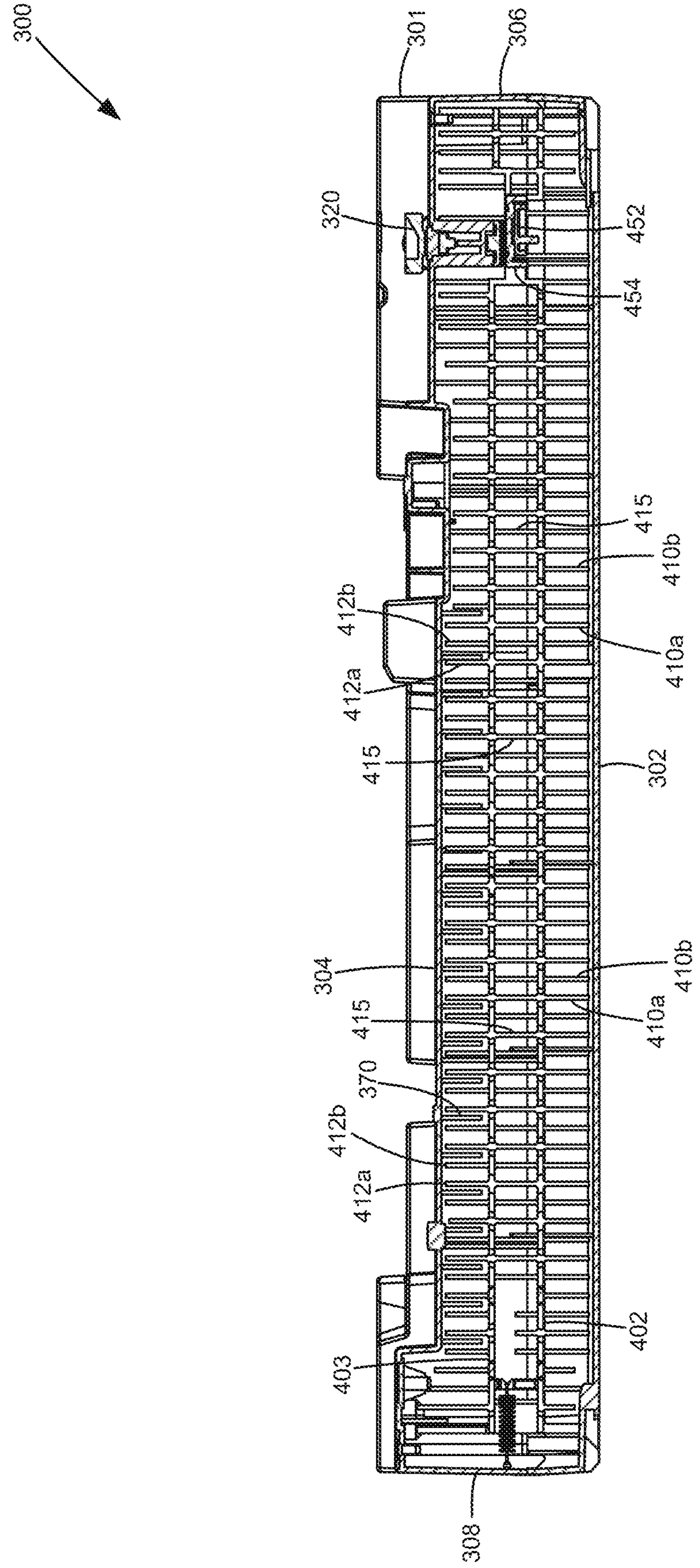
FIG. 7 is a top section view of the waste toner container according to one example embodiment.

FIG. 4 is a perspective view of waste toner container 300 with front wall 302 removed to show interior components of waste toner container 300. FIG. 5 shows an exploded view of waste toner container 300. FIG. 6 is a side perspective section view of waste toner container 300. FIG. 7 is a top section view of waste toner container 300.

Waste toner may tend to form heaps at locations below waste toner inlet ports 351, 352, 353, 354, 355 as waste toner enters waste toner container 300 from waste toner inlet ports 351, 352, 353, 354, 355. To prevent waste toner from piling high enough to block waste toner inlet ports 351, 352, 353, 354, 355, which may result in the failure of assemblies such as PC drums 502 and ITM 54 to expel waste toner, waste toner container 300 includes a toner rake assembly 400 for spreading waste toner within waste toner container 300. In the embodiment illustrated, toner rake assembly 400 includes a first spine member 402 and a second spine member 403 extending parallel relative to each other along a lengthwise dimension 367 of waste toner container 300.

Spine members 402, 403 support a plurality of spaced apart ribs 415 extending between inner faces of spine members 402, 403, a plurality of spaced apart tines **410*a*, 410*b* (generally designated as tines 410) extending from an outer face of spine member 402, and a plurality of spaced apart tines 412*a*, 412*b* (generally designated as tines 412) extending from an outer face of spine member 403. In the embodiment illustrated, the plurality of spaced apart tines 410*a*, 410*b* extending from spine member 402 forms a row of upper tines 410*a* and a row of lower tines 410*b* while the plurality of spaced apart tines 412*a*, 412*b* extending from spine member 403 forms a row of upper tines 412*a* and a row of lower tines 412*b*. In the embodiment illustrated, upper tines 410*a*, 412*a* are horizontally aligned, such that upper tines 410*a*, 412*a* all have substantially the same vertical position, and evenly spaced from each other, and lower tines 410*b*, 412*b* are horizontally aligned, such that lower tines 410*b*, 412*b* all have substantially the same vertical position, and evenly spaced from each other. In addition, upper tines 410*a*, 412*a* are staggered and laterally offset relative to lower tines 410*b*, 412*b* along lengthwise dimension 367. In the embodiment illustrated, the tips of upper tines 410*a* and lower tines 410*b* extend and reach close to front wall 302 of waste toner container 300, and the tips of upper tines 412*a* and lower tines 412*b* extend and reach close to rear wall 304 of waste toner container 300**.

Tines 410, 412 and ribs 415 of toner rake assembly 400 are arranged to interact with toner piles that accumulate within waste toner container 300. In one embodiment, toner rake assembly 400 is movable in a reciprocating manner along lengthwise dimension 367 such that tines 410, 412 and ribs 415 spread toner and reduce uneven waste toner buildup within waste toner container 300. In the embodiment illustrated, toner rake assembly 400 is operatively connected to drive coupler 320 so that spine members 402, 403 are movable in a reciprocating, back-and-forth manner along lengthwise dimension 367 when drive coupler 320 rotates upon receiving rotational force from drive coupler 270 in image forming device 20. A support guide 380 mounted within waste toner container 300 is positioned to receive a slider 430 formed between spine members 402, 403 to support the reciprocating motion of spine members 402, 403.

Toner rake assembly 400 includes a drive assembly 450 for driving spine members 402, 403 to oscillate. In the embodiment illustrated, drive assembly 450 includes a cam follower 454, shown formed as part of spine members 402, 403, and a rotatable cam 452 coupled to cam follower 454.

Figure 8A:
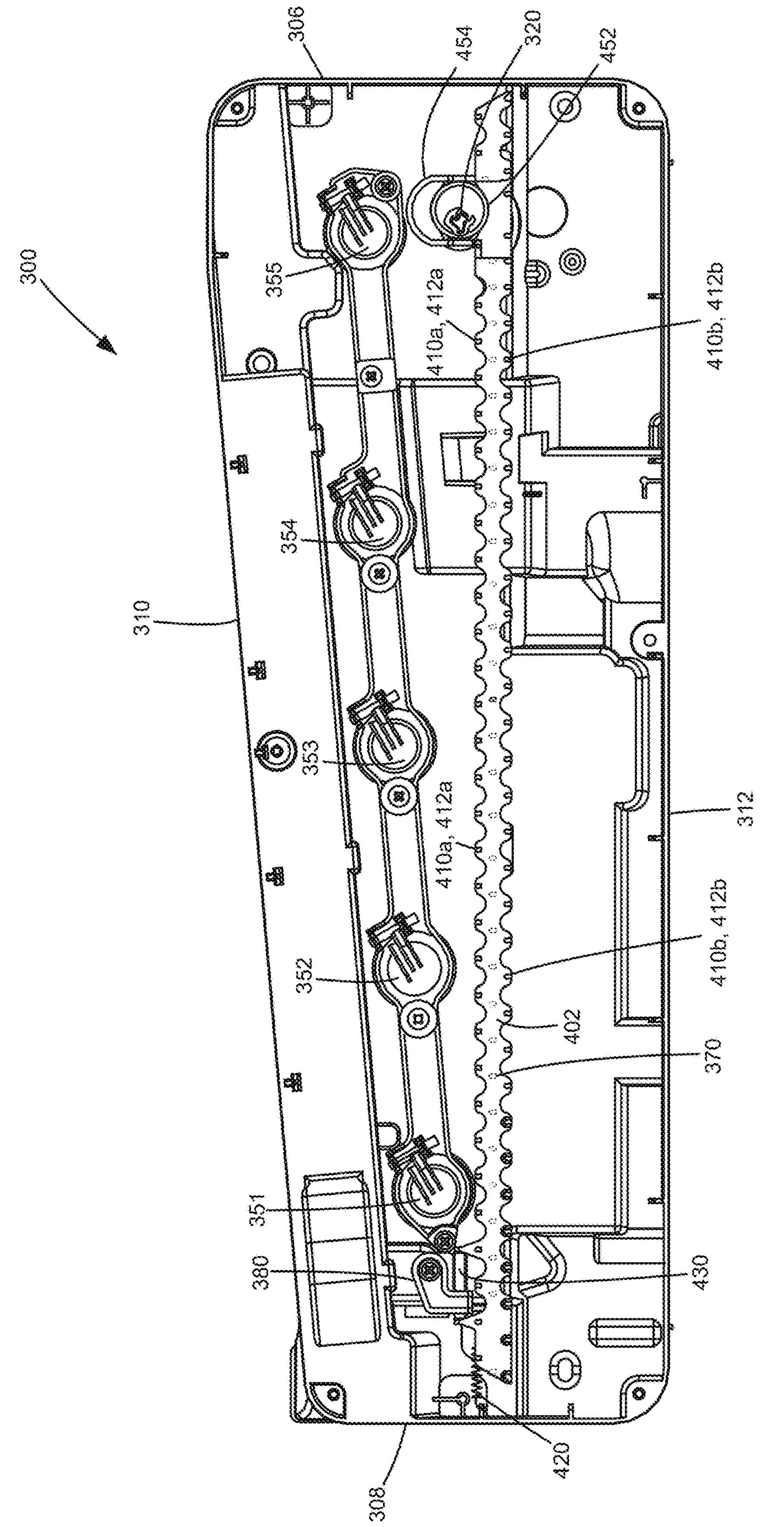
FIGS. 8A and 8B are front elevation views of the waste toner container showing the toner rake assembly at a first position and a second position, respectively, according to one example embodiment.
Figure 8B:
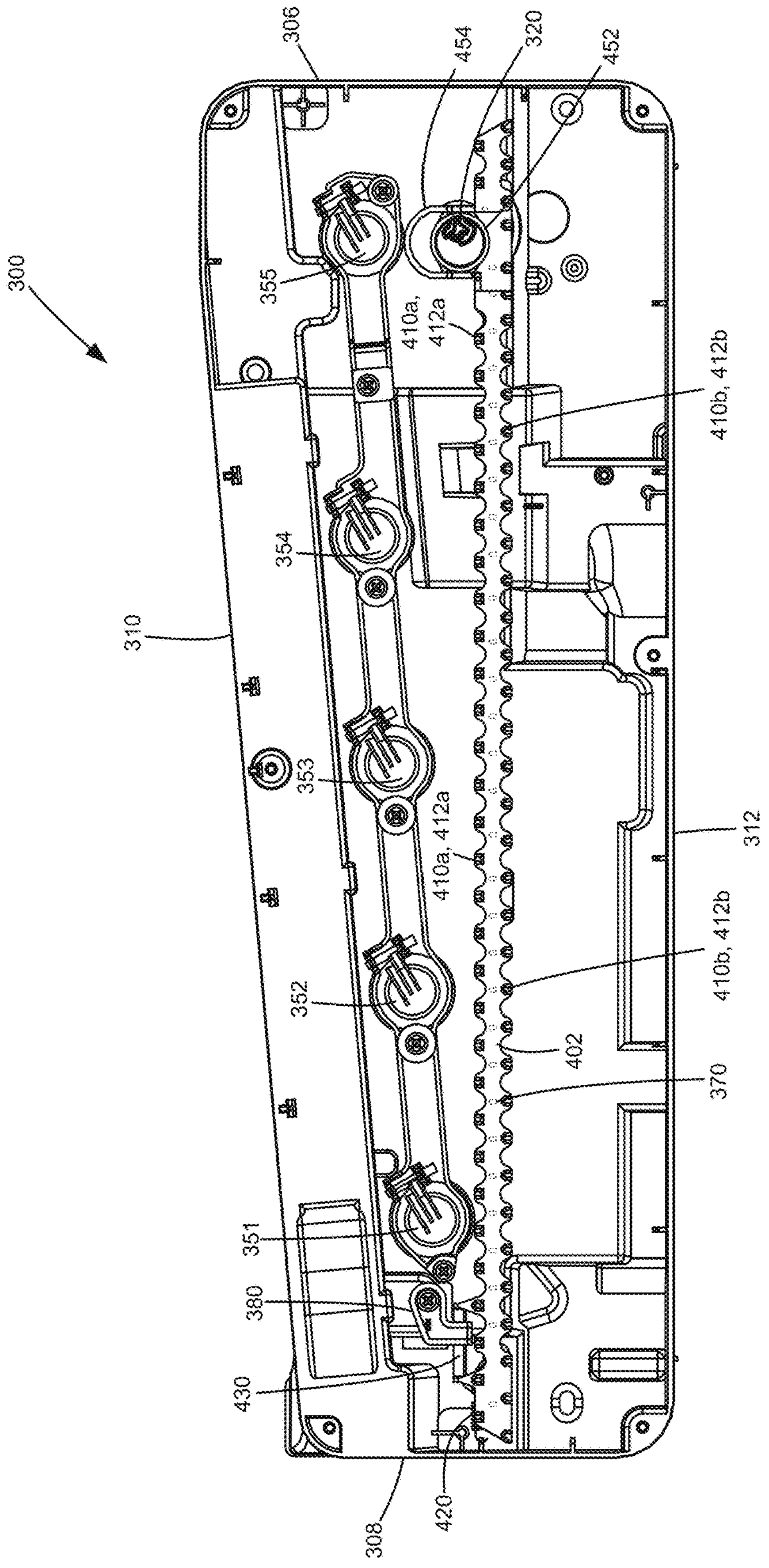

In this embodiment, rotatable cam 452 is an eccentric cam having a rotational axis that is offset from a center of cam 452. Spine members 402, 403 are continuously biased toward side 308 of housing 301 by a biasing spring 420 in order to maintain engagement between cam follower 454 and cam 452. Cam 452 is coupled to drive coupler 320 such that cam 452 is rotatable with drive coupler 320 when drive coupler 320 rotates. When cam 452 rotates, the cam profile of cam 452 changes the point of contact with cam follower 454 causing cam follower 454 to move in a reciprocating manner. For example, when cam 452 rotates to a first rotational position shown in FIG. 8A, cam 452 pushes cam follower 454 and, in turn, spine members 402, 403 toward a rightmost position as viewed in FIG. 8A. When cam 452 rotates to a second rotational position shown in FIG. 8B, cam 452 pushes cam follower 454, and, in turn, spine members 402, 403, toward a leftmost position as viewed in FIG. 8B. In other embodiments, rotational motion of drive coupler 320 may be converted into linear reciprocating motion of spine members 402, 403 using other techniques.

Toner rake assembly 400 includes a row of spaced apart static tines 370 positioned on an interior of rear wall 304 of waste toner container 300. Static tines 370 are connected to rear wall 304 and protrude in an opposite direction relative to upper tines 412*a* and lower tines 412*b* with tips of static tines 370 reaching close to spine member 403. In the embodiment illustrated, static tines 370 extend from and are formed as part of rear wall 304. The row of static tines 370 is positioned in between the row of upper tines 412*a* and the row of lower tines 412*b* extending from the outer face of spine member 403. In the embodiment illustrated, the row of static tines 370 is midway between the row of upper tines 412*a* and the row of lower tines 412*b*. Static tines 370 overlap with upper tines 412*a* and lower tines 412*b* along lengthwise dimension 367 such that an imaginary vertical plane intersects static tines 370, upper tines 412*a* and lower tines 412*b*. Although not shown, a similar row of static tines may be disposed on front wall 302 between upper tines 410*a* and lower tines 410*b* extending from the outer face of spine member 402 with such static tines having tips reaching close to spine member 402. Although static tines 370 are shown extending from rear wall 304 of waste toner container 300, static tines 370 may extend from a fixed surface within waste toner container 300 in other embodiments.

In the example embodiment illustrated, spine members 402, 403 oscillate continuously while image forming device 20 is generating waste toner during a printing operation. As spine members 402, 403 oscillate, upper tines 412*a* and lower tines 412*b* disrupt potential heaps of toner by pushing toner back and forth until waste toner evens out, allowing waste toner container 300 to effectively fill a volume of waste toner container 300, such as up to a height of spine members 402, 403. In this example, a single sensor above toner rake assembly 400 may be used for determining when waste toner container 300 may be declared full. The rate at which waste toner enters waste toner container 300 may vary depending on the rate at which waste toner is generated during printing. For example, relatively high image density may result in higher waste toner flow rate at the waste toner inlet ports 351, 352, 353, 354, 355. If toner rake assembly 400 falls behind at breaking down heaps of waste toner that are forming, heaps of toner may continually grow and blockage at one or more of waste toner inlet ports 351, 352, 353, 354, 355 may occur before waste toner container 300 reaches full capacity and the sensor declares the waste toner volume full.

Figure 9A:
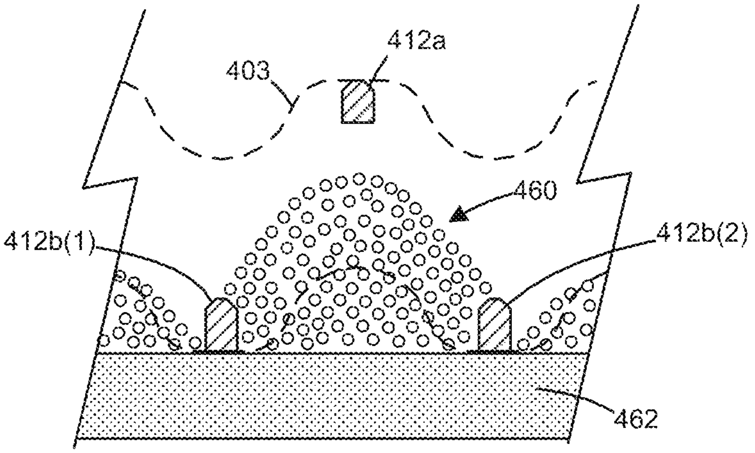
FIGS. 9A-9C are sequential schematic views illustrating the operation of the toner rake assembly with no static tines.
Figure 9B:
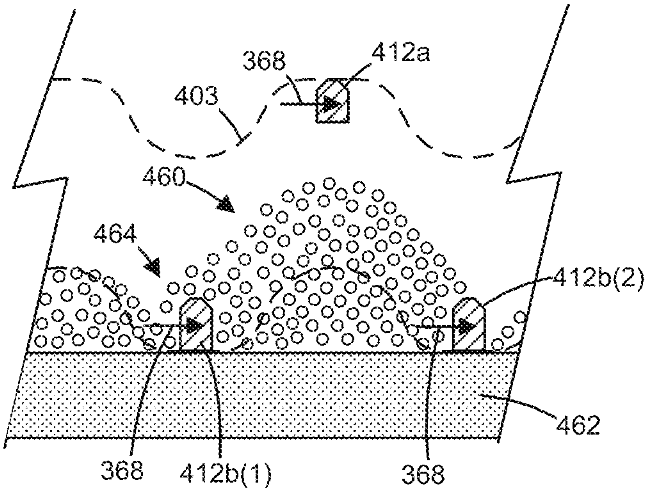
Figure 9C:
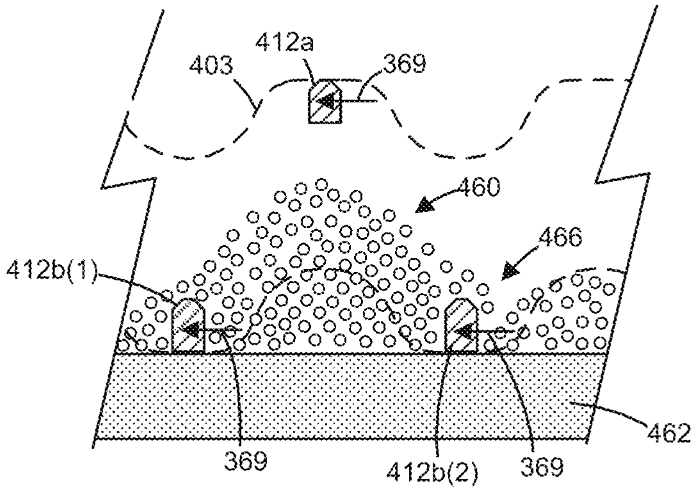

As an example, FIGS. 9A-9C illustrate the operation of upper tines 412*a* and lower tines 412*b* protruding from spine member 403 when spine member 403 is oscillated in directions 368, 369 with no static tine 370 between upper tines 412*a* and lower tines 412*b*. When toner reaches past a height of the row of lower tines 412*b*, small heaps of toner may begin to form such as, for example, a heap 460, between lower tines 412*b*(1), 412*b*(2) (generally designated as lower tines 412*b*). As spine member 403 oscillates, heap 460 may tend to oscillate with lower tines 412*b* as heap 460 is pushed back and forth by lower tines 412*b* across the top of a stationary lower mass of toner 462 with heap 460 primarily holding its form. Each time spine member 403 switches direction, inertia causes some toner particles to roll down heap 460 and over a corresponding lower tine 412*b* on a side that is beginning to push heap 460.

For example, in FIG. 9B, when lower tines 412*b* move with spine member 403 in direction 368, lower tine 412*b*(1) pushes heap 460 in direction 368 causing toner particles 464 to roll down heap 460 over to the left side of lower tine 412*b*(1). In FIG. 9C, when lower tines 412*b* move with spine member 403 in direction 369, lower tine 412*b*(2) pushes heap 460 in direction 369 causing toner particles 466 to roll down heap 460 over to the right side of lower tine 412*b*(2). Most of the toner particles may tend to adhere to heap 460 due to friction (and possibly due to electrical attraction) between toner particles. If toner rake assembly 400 falls behind at breaking down heap 460 that is forming, such as when waste toner flows into waste toner container 300 at a relatively high rate, heap 460 may continually grow and block a corresponding waste toner inlet port 351, 352, 353, 354, 355 before waste toner container 300 reaches full capacity. Static tines 370 disposed between upper and lower tines 412*a*, 412*b* of spine member 403 help reduce this effect and aid in breaking down heaps of waste toner.

Figure 10A:
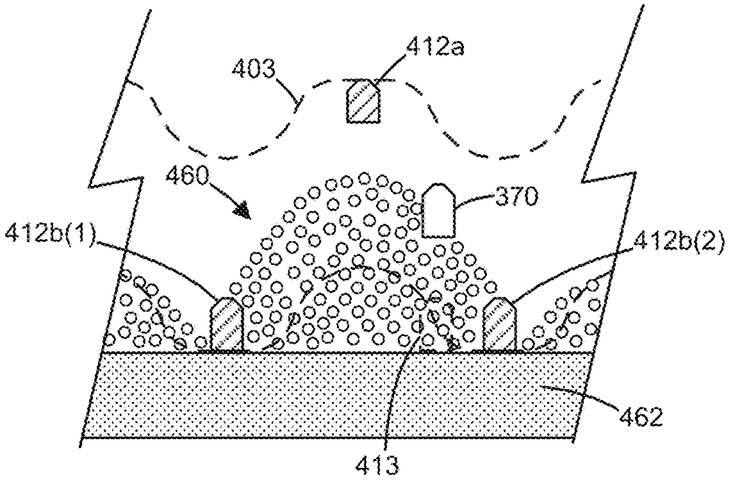
FIGS. 10A-10C are sequential schematic views illustrating the operation of the toner rake assembly with static tines according to one example embodiment.
Figure 10B:
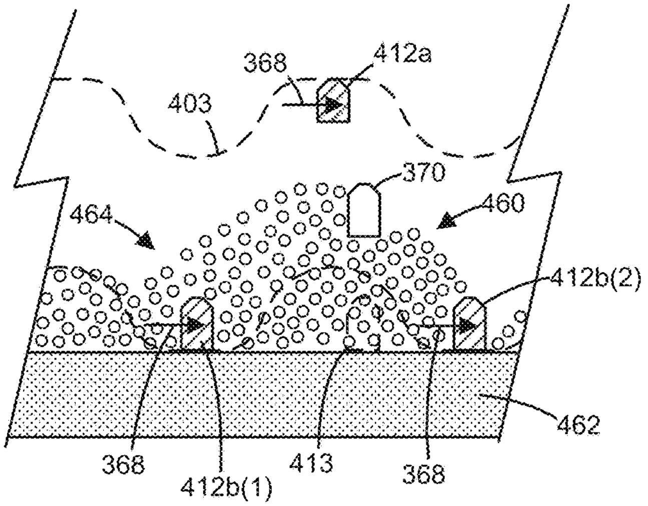
Figure 10C:
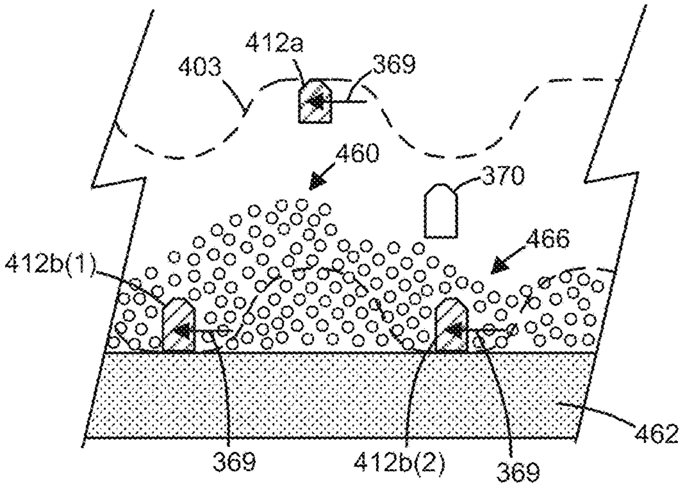

FIGS. 10A-10C illustrate the operation of toner rake assembly 400 relative to heap 460 of toner when a static tine 370 is positioned between upper tines 412*a* and lower tines 412*b* protruding from spine member 403 according to one example embodiment. Heap 460 of toner begins to form between lower tines 412*b* when toner reaches past a height of the row of lower tines 412*b*. As spine member 403 oscillates, heap 460 may oscillate with lower tines 412*b* as heap 460 is pushed back and forth by lower tines 412*b* across the top of stationary lower mass of toner 462 with heap 460 primarily holding its form as discussed above with respect to FIGS. 9A-9C.

Heap 460 of toner may grow as waste toner continues to flow into waste toner container 300. When heap 460 reaches past a height of static tine 370, static tine 370 provides a firm barrier to the motion of heap 460. For example, in FIG. 10B, when lower tines 412*b* move with spine member 403 in direction 368, lower tine 412*b*(1) pushes heap 460 in direction 368 thereby pushing heap 460 into static tine 370. As heap 460 is pushed in direction 368 through static tine 370, static tine 370 scrapes toner from heap 460 in the opposite direction, causing toner particles 464 to roll down heap 460 over to the left side as viewed in FIG. 10B. Meanwhile, inertia causes some of toner particles 464 to roll down heap 460 over to the left side of lower tine 412*b*(1) that is pushing heap 460 in direction 368 in the same manner as discussed above with respect to FIG. 9B.

When lower tines 412*b* move with spine member 403 in direction 369 as shown in FIG. 10C, lower tine 412*b*(2) pushes heap 460 in direction 369 thereby pushing heap 460 into static tine 370 and causing static tine 370 to scrape toner from heap 460 in the opposite direction and cause toner particles 466 to roll down heap 460 over to the right side as viewed in FIG. 10C. At the same time, inertia causes some of toner particles 466 to roll down heap 460 over to the right side of lower tine 412*b*(2) that is pushing heap 460 in direction 369 in the same manner as discussed above with respect to FIG. 9C.

In one embodiment, a range of oscillatory motion of lower tines 412*b* may be selected to allow static tine 370 to scrape a significant amount of toner heap 460. For example, lower tine 412*b*(1) may be movable between its position shown in FIG. 10A and a position 413 depicted by phantom lines in FIGS. 10A and 10B. In this example, static tine 370 can scrape more toner from heap 460 over to the left side of heap 460 as viewed in FIG. 10B when lower tine 412*b*(1) moves further from the position shown in FIG. 10B to position 413 as heap 460 moves with lower tines 412*b* in direction 368. Thus, by positioning static tines 370 between lower tines 412*b* and upper tines 412*a* and oscillating lower tines 412*b* within a predetermined range, heaps of toner may be broken down faster which allows for toner container to accommodate higher waste toner flow rate in comparison with the use of a toner rake assembly without static tines.

Figure 11:
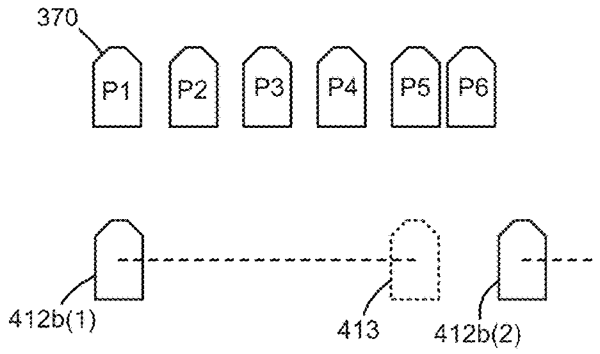
FIG. 11 is a schematic view illustrating multiple example positions of a static tine relative to two adjacent lower tines according to one example embodiment.

In one example embodiment, the positioning of static tines 370 relative to lower tines 412*b* influences the movement of toner within waste toner container 300. FIG. 11 illustrates multiple example positions P1-P6 of a static tine 370 relative to lower tines 412*b*. In the example illustrated, lower tines 412*b* may be about 1.5 mm wide and spaced apart from each other by about 13 mm. Lower tine 412*b*(1) is movable between an initial position shown in FIG. 11 and position 413. The range of motion of lower tine 412*b*(1) between the initial position and position 413, for instance, may be about 9.5 mm (or about 4.75 mm amplitude of lower tine oscillation). In the example illustrated, the relative positioning of static tine 370 above two adjacent lower tines 412*b* provides a barrier that favors pushing toner from the top of a toner heap or pile to a particular direction as static tine 370 engages the toner pile during the reciprocating motion of lower tines 412*b*. Table 1 shows experimentally determined influence on a favored direction of toner flow by static tine 370 at the example positions P1-P6 shown in FIG. 11.

TABLE 1

| Tine position | Favors pushing toner |
|---|---|
| P1 | Strongly right |
| P2 | Slightly right |
| P3 | Neutral |
| P4 | Slightly left |
| P5 | Strongly left |
| P6 | Neutral |

Figure 12:
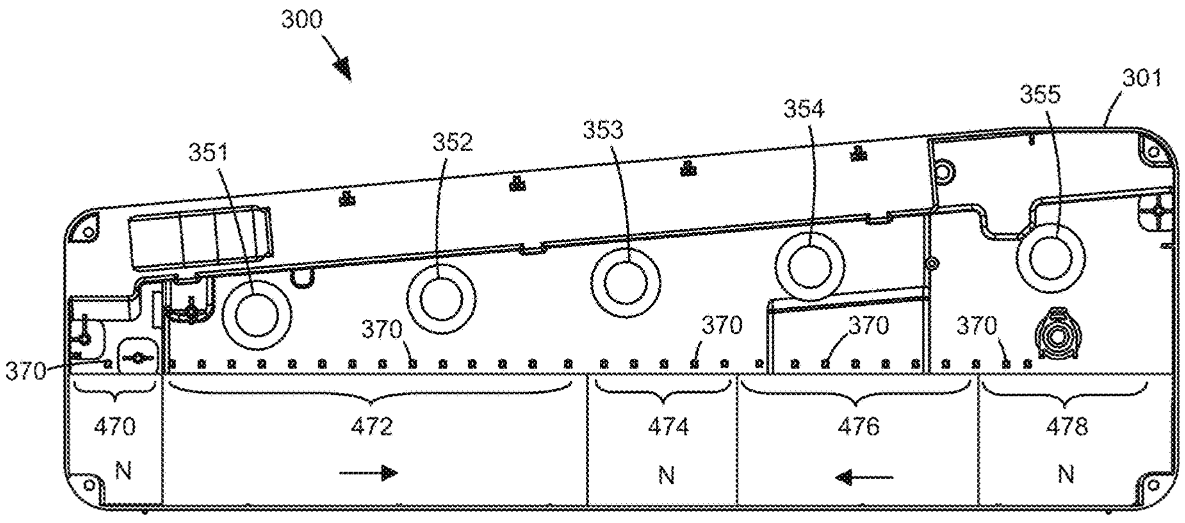
FIG. 12 is a front elevation view of the waste toner container illustrating static tines arranged to influence different toner flow directions in different regions of the waste toner container according to one example embodiment.

Each static tine 370 may be positioned in a manner that partially controls the direction of toner flow within waste toner container 300. For example, static tines 370 may be arranged such that toner flow may be directed more heavily away from parts of waste toner container 300 with the heaviest amount of waste (e.g., under the black and ITM waste toner inlet ports) towards parts of waste toner container 300 with the least amount of waste (e.g., under the cyan waste toner inlet port). As an example, FIG. 12 illustrates waste toner container 300 with different sets of static tines 370 selectively arranged to influence different toner flow directions in different regions of waste toner container 300.

In the example illustrated, the relative positions of static tines 370 in regions 472, 476 are selected to direct toner at most positions toward, for example, region 474 under waste inlet port 353, where a lowest amount of waste toner tends to accumulate prior to heaps beginning to form above the height of toner rake assembly 400. Meanwhile, the relative positions of static tines 370 in region 474 are selected to be neutral (N) to allow even distribution of toner within region 474. At the opposite ends of waste toner container 300, the relative positions of static tines 370 in regions 470, 478 are selected to be neutral (N) to avoid the possibility of failing to fill the spaces at the ends of waste toner container 300, such as before a fill sensor above toner rake assembly 400 is tripped. In this example, at least some of static tines 370 are arranged unevenly spaced from each other to influence different toner flow directions within waste toner container 300.

Toner rake assembly 400 utilizing static tines 370 to distribute toner within waste toner container 300 provides advantages over known methods of distributing toner. For instance, since toner is more effectively distributed within waste toner container 300, fewer sensors, such as a single sensor above toner rake assembly 400, may be employed in some embodiments to perform toner level sensing instead of utilizing multiple sensors to detect toner level at multiple locations within waste toner container 300. Further, the use of static tines 370 increases the rate of toner input that can be handled by toner rake assembly 400 without having to increase the speed of oscillation of toner rake assembly 400. In particular, static tines 370 aid in quickly breaking down the heaps of toner that are forming, which avoids the need to increase the speed of oscillation of the toner rake assembly in order for the toner rake assembly to keep up with higher toner input rates. This, in turn, avoids an increase in unwanted printer noise and/or any increase in load on the motor driving the toner rake assembly that may occur by increasing the speed of oscillation of the toner rake assembly. Detrimental impact on print quality may also be avoided such as in systems where the toner rake assembly is driven by a gear that is driven by other printer assemblies, such as an intermediate transfer member, in which large loads may impact print quality.

Although the example embodiments discussed above show toner rake assembly 400 having two spine members 402, 403, it will be appreciated that toner rake assembly 400 may include more or fewer spine members 402, 403 as desired. Further, although ribs 415, tines 410, 412, and static tines 370 are shown as being disposed parallel to each other and perpendicularly transverse to spine members 402 and 403, ribs 415, tines 410, 412, and/or static tines 370 may be disposed at any angle relative to spine members 402, 403. For example, tines 410 extending from spine member 402 may be disposed at an angle different from that of tines 412 extending from spine member 403, and individual tines 410, 412 extending from spine members 402, 403 may be disposed differently than others in order to spread toner within waste toner container 300 as desired. In another example, static tines 370 may extend in the same direction as tines 412 while positioned between upper tines 412*a* and lower tines 412*b*.

Although the example embodiments discussed above utilize toner rake assembly 400 in a waste toner container, it will be appreciated that the teachings and concepts provided herein may be used to distribute and/or partially control toner flow in any reservoir or sump storing toner in image forming device 20. Further, although the example embodiments discussed above discuss a system for distributing and/or controlling flow of toner, it will be appreciated that the teachings and concepts provided herein may be used to distribute and/or control other consumable materials within a container, such as, for example, particulate materials other than toner (e.g., grain, seed, flour, sugar, salt, etc.).

Further, although the example image forming device 20 discussed above includes four toner cartridges 100 and corresponding developer units 200 and PC units 500, more or fewer replaceable units may be used depending on the color options needed. For example, in one embodiment, the image forming device includes a single toner cartridge and corresponding developer unit and PC unit in order to permit monochrome printing.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A toner rake assembly for an image forming device, comprising:

a spine movable in a reciprocating manner along a length of the spine;

a plurality of first projections from the spine that are movable with the spine; and a plurality of second projections from a fixed surface adjacent to the spine such that the plurality of first projections are movable relative to the plurality of second projections when the spine moves in the reciprocating manner, the plurality of second projections are positioned above the plurality of first projections such that heaps of toner that form above the plurality of first projections are pushed against one or more of the plurality of second projections when the spine moves in the reciprocating manner.

2. The toner rake assembly of claim 1, wherein the plurality of first projections protrude in a first direction and the plurality of second projections protrude in a second direction opposite the first direction.

3. The toner rake assembly of claim 1, wherein the plurality of first projections and the plurality of second projections are parallel relative to each other.

4. The toner rake assembly of claim 1, wherein the plurality of second projections are perpendicular relative to the spine.

5. The toner rake assembly of claim 1, wherein the plurality of second projections extend in close proximity to the spine.

6. The toner rake assembly of claim 1, wherein the plurality of first projections overlap with the plurality of second projections such that an imaginary vertical plane extending along the length of the spine intersects the plurality of first projections and the plurality of second projections.

7. The toner rake assembly of claim 1, wherein at least some of the plurality of second projections are arranged unevenly spaced from each other for directing toner in a predetermined direction along the length of the spine.

8. The toner rake assembly of claim 1, further comprising a plurality of third projections from the spine that are movable with the spine, wherein the plurality of third projections are positioned above the plurality of second projections.

9. A toner rake assembly for an image forming device, comprising:

a spine movable in a reciprocating manner along a length of the spine;

a plurality of rake tines extending from the spine and movable with the spine; and a plurality of static tines extending toward the spine, the plurality of rake tines are movable relative to the plurality of static tines when the spine moves in the reciprocating manner, the plurality of static tines are positioned above the plurality of rake tines and an imaginary vertical plane extending along the length of the spine intersects the plurality of static tines and the plurality of rake tines.

10. The toner rake assembly of claim 9, wherein the plurality of rake tines and the plurality of static tines are parallel relative to each other.

11. The toner rake assembly of claim 9, wherein the plurality of static tines are perpendicular relative to the spine.

12. The toner rake assembly of claim 9, wherein the plurality of static tines extend in close proximity to the spine.

13. The toner rake assembly of claim 9, wherein at least some of the plurality of static tines are arranged unevenly spaced from each other for directing toner in a predetermined direction along the length of the spine.

14. The toner rake assembly of claim 9, further comprising a plurality of upper rake tines extending from the spine and movable with the spine, wherein the plurality of upper rake tines are positioned above the plurality of static tines.

15. A waste toner container for an image forming device, comprising:

a housing having a reservoir for storing toner and an inlet for receiving toner;

a spine positioned within the reservoir and movable in a reciprocating manner along a length of the spine;

a plurality of rake tines extending from the spine and movable with the spine; and a plurality of static tines extending from a fixed surface toward the spine, the plurality of rake tines extending toward the fixed surface, the plurality of rake tines are movable relative to the fixed surface and the plurality of static tines when the spine moves in the reciprocating manner, the plurality of static tines are positioned lower than the inlet and above the plurality of rake tines for breaking down toner heaps between the plurality of rake tines and the inlet when the spine moves in the reciprocating manner.

16. The waste toner container of claim 15, wherein the plurality of rake tines and the plurality of static tines are parallel relative to each other.

17. The waste toner container of claim 15, wherein the plurality of static tines are perpendicular relative to the spine.

18. The waste toner container of claim 15, wherein the plurality of static tines extend in close proximity to the spine.

19. The waste toner container of claim 15, wherein the plurality of rake tines overlap with the plurality of static tines such that an imaginary vertical plane extending along the length of the spine intersects the plurality of rake tines and the plurality of static tines.

20. The waste toner container of claim 15, wherein at least some of the plurality of static tines are arranged unevenly spaced from each other for directing toner in a predetermined direction along the length of the spine.

* * * * *